3,322,659
TREATING OF ELECTROLYTIC ALUMINUM REDUCTION CELL GASES TO RECOVER FLUORINE VALUES
Jean Louis Paquet, 306 Begin, Arvida, Chicoutimi County, Quebec, Canada
No Drawing. Filed June 17, 1964, Ser. No. 375,941
13 Claims. (Cl. 204—67)

This invention relates to the removal of noxious fluorine compounds from aluminum reduction cell waste-gas. Also, the invention relates to the recovery of fluorine values from waste gas in a form which can be returned to the reduction cell.

Aluminum reduction cells (pots) produce a waste-gas (potroom gas) which includes besides air, carbon monoxide, hydrogen fluoride, sulfur dioxide, small amounts of $CF_4$ and COS, and particles of alumina and carbonaceous matter and solid fluorine compounds. In the case of the continuous self-baking electrode type pot, i.e., the Soderberg cell, the waste-gas includes considerable amounts of carbon particles and semi-solid tar particles. It is desirable that the fluorine compounds and the carbonaceous materials be removed before the gas stream is discharged to the atmosphere.

Usually, the waste gases are scrubbed with water or a reagent solution to remove hydrogen fluoride and sulfur dioxide. While these operations are efficient in removing these acidic gases, they are not efficient in the removal of other fluorine compounds, and are very poor in removal of the carbonaceous bodies.

Some years ago a "dry scrubbing" operation was introduced into the Industry. In this operation a dry material, such as alumina or limestone, is introduced into the water-gas stream where it reacts with the hydrogen fluoride. The solid reaction products are filtered from the gas stream by bag filters.

In another variation, the alumina or limestone is used as a precoat on a bag filter and the waste-gas passed therethrough. This operation requires very fine precoat solids, e.g., —325 mesh, and a very large amount of these solids to remove the fluorine content. When handling Soderberg pot waste-gases, the carbonaceous materials very drastically decrease the effectiveness of this operation; therefore, this operation does not lend itself to use on Soderberg lines. Because of the inefficient use of alumina in dry scrubbing operation, the fluorine values in the spent alumina are low and the spent alumina has a limited utility as a source of fluorine for other purposes.

An object of the invention is a process for removing noxious fluorine bodies present in reduction cell waste-gas.

A particular object is a process for removing such fluorine bodies without use of wet or dry scrubbing techniques.

A preferred object is a process for cleaning up aluminum reduction cell waste-gases, and recovering the fluorine values in solid form, reusable in the pots.

Other objects will become apparent from the detailed description of the invention.

Briefly, in the process of the invention, an aluminum reduction cell waste-gas containing fluorine compounds, both gaseous and solid, is treated with ammonia gas to form a solid reaction product, and the solid reaction-product is then filtered from the treated gas stream. Preferably, sufficient ammonia is used to react with all the hydrogen fluoride present in the waste-gas.

The gas stream charged to the process of the invention may be any aluminum reduction cell waste-gas which contains gaseous HF and other fluorine compounds.

It has been observed that when the feed gas includes both hydrogen fluoride and sulfur dioxide, the fluoride is preferentially reacted by the ammonia. By controlling the amount of ammonia introduced, the fluoride impurity may be essentially entirely removed, while the major portion of the sulfur dioxide remains in the stream. Essentially all of the acidic constituents of such a stream can be removed by adding sufficient ammonia to react with all the acidic constituents present; this is a preferred operation.

Preferably the treating of the gas stream with ammonia gas is carried out at a temperature whereat a solid reaction product is formed immediately. However, the treating may be carried out at a temperature whereat a vapor product is formed; the treated gas stream is then cooled to condense the vapors; the solid particles are then filtered from the cooled gas stream.

The ammonia gas is introduced into the stream of defined feed gas and the reaction takes place. No special provisions for mixing the two are ordinarily needed.

The solid reaction product is separated from the treated gas stream by filtration. Filtration here is intended to include filters, cyclone separators, and electrostatic precipitators; in other words any separation of a dispersed solid material from a gas which separation involves removal of the solid as such.

A preferred form of filter is the conventional bag filter (bag collector). Felt filters or cloth filters may be used. Desirably, these are operated with a precoat.

When conventional bag filters, precoated with alumina, are used to clean-up gas streams containing carbonaceous particles, e.g., waste-gas from Soderberg pots, the life of the precoat is short. It has been discovered that on Soderberg pot waste-gas, the process of the invention gives a precoat life many times longer than that obtained in the conventional dry scrubbing operations.

Solids recovered from waste gas in bag filters are normally returned to the aluminum reduction cells. However, in the case of solids containing "ammonia" a possible hazard exists in that dangerous substances, such as nitrogen trifluoride, may be formed in the cell.

It has been discovered that all of the ammonia content of the recovered ammonia solids can be removed by heating the solids. Both temperature and time must be considered in this heating operation. In general, the ammonia solids are heated at a temperature of at least about 300° C. for the time needed to evolve the ammonia content, e.g., about 4 hours. By heating at temperatures on the order of 700° C., it is possible to evolve the sulfur content ($SO_4^{--}$) of the ammonia solids.

The solids recovered by the filter include not only the ammonia solids but also major amounts of alumina and cryolite. This alumina, cryolite and other solids recovered from the waste-gas by the filters can be used in the aluminum reduction cells after the ammonia content has been removed by the aforedescribed heating operation.

In commercial operation of the reduction cell, alumina is placed on the crust portion of the cell to be heated. Periodically the crust is broken and the alumina charged into the bath. It has been found that the recovered ammonia solids and other solid fluorine values recovered by the filters can be adequately heat treated to evolve the ammonia content by being deposited on the crust of the cell and permitted to remain there for the time necessary to evolve essentially all of the ammonia content.

Since it is normal to operate bag filters with an alumina precoat, the recovered ammonia solids will be admixed with the alumina precoat and the entire mixture placed on the cell crust. However, should the filter not include alumina precoat, it is preferred that the recovered ammonia solids be admixed with alumina before the heating operation. It is preferred that the alumina mixed with the recovered ammonia solids be substantially anhydrous, as the presence of water appears to result in the loss of fluorine values during the heating operation.

It is preferred that the body of ammonia solids be covered with alumina during the heating step. This procedure has some benefit with respect to conservation of fluorine values.

In the preferred embodiment of the process of this invention, fluorine values present in the waste gas from aluminum reduction cells is recovered by treating the waste gas stream with ammonia under conditions that a solid ammonia reaction product is formed. The solid ammonia product and other solids present in the waste gas stream, including solid fluorine values, are recovered by filtering the treated gas stream. It is preferred to use a bag filter operation utilizing alumina precoat. The recovered ammonia solids and other solid fluorine values are heated at conditions of temperature and time such that essentially all of the ammonia content is evolved therefrom, leaving a solid fluorine value residue. Preferably this heating operation is at a temperature of at least about 300° C. Also, it is preferred that the recovered solids are heated on the crust of an aluminum reduction cell; the heating time will be on the order of about 1 hour, when the recovered solids on the crust have been covered with a layer of alumina. When the ammonia has been evolved, the crust of the cell is broken and the residue and alumina charged into the bath of the cell.

The liberated ammonia passes out with the waste-gas to the recovery operation; enroute it reacts with the noxious fluorine compounds therein. Thus in this preferred embodiment of the process, there exists a circulating amount of ammonia gas; makeup ammonia is added to replace inevitable losses.

When the waste-gas includes aerosol size fume particles, either solids or semi-solid tars, such as are present in Soderberg pot-gases, the waste-gas can be freed of the fume particles as well as of the fluorine compounds very efficiently by a combination process utilizing ammonia gas. Substantially simultaneously with the introduction of the ammonia gas, there is injected into the gas stream finely divided coke, charcoal, carbon, alumina, cryolite, or aluminum fluoride. The gas stream containing the solid ammonia reaction products and the added particles is then filtered. Essentially all of the fluorine compounds and all of the fume particles are removed from the gas stream by this combination treatment. Felt and cloth bag filters can be used almost indefinitely in this combination operation, without any additional precoat material.

When it is desired to remove only the fume particles, either solid, semi-solid or liquid, from a gas stream, treating the gas with injected finely divided coke, charcoal or carbon and subsequent filtrations, efficiently removes the fume particles from the gas stream.

ILLUSTRATIONS

I (A) It has been observed in the treatment of Soderberg pot gases using a precoat filter to remove the solid ammonia product that the solids recovered from the bag filter can be converted into a three phase system by adding water to the filter solids. The extraction vessel contents separate into a middle layer of solution, a bottom layer of precoat solids and other insoluble solids, and a supernatant layer of viscous hydrocarbons. The hydrocarbons are easily skimmed off the solution. The wet solids are filtered from the solution—these can be dried and recycled to the pot, according to the process of the invention.

(B) In contrast, the alumina precoat of a conventional filter on Soderberg gases, cannot be freed of the adhered tars by water extraction; the hydrocarbons must be burned off.

II

Soderberg pot waste-gases were treated with ammonia and recovered on felt filter bags without the use of a precoat. The recovered solids were subjected to analysis and to X-ray diffraction examination. The XRD examination established: the sulfur was present in the form of ammonium sulfate rather than sulfite; both cryolite and chiolite were present; carbon al alumina were present; aluminum fluoride was a likely constituent. No evidence for the presence of ammonium bifluoride was found. Ammonium fluoride is present. In this particular instance the solid product included these ammonium compounds: about 15% was present as ammonium fluoride and the remainder as ammonium sulfate.

The recovered solids were extracted with water. The water solution included the ammonium sulfate and ammonium fluoride present in the solids. A very small amount of cryolite is soluble. Thus water leaching is a simple way of removing the ammonia and the sulfate from the major amount of fluorine values, which can then be recycled to the pots.

III

Waste-gases which contained no tars from a prebaked electrode aluminum reduction cell were treated with ammonia gases. A solid reaction product was formed as evidenced by the appearance of a fume gas. A felt bag filter removed the fumes. The use of a slight excess of ammonia, over the theoretical to react the hydrogen fluoride present, gave a filtered gas completely free of hydrogen fluoride.

IV (A) A test was carried out on a Soderberg reduction cell off-gases which contained HF, solid particles and tars. The pot-gases were passed into a bag filter where they were contacted by commercial cylinder ammonia gas, introduced at the inlet duct of the filter. The bag filter was Orlon cloth and was precoated with 90 lbs. of fine alumina. With an ammonia usage equal to the theoretical requirement, about 7 pounds per stream day, the effluent gases were fume free and essentially no HF was present. Using this amount of alumina precoat and this rate of ammonia addition, after 36 hours on stream without renewal of precoat, this bag filter was giving 99% total fluoride removal, with the HF content of the effluent gas at 0–1 p.p.m.

(B) In conventional dry scrubbing service on these pot gases, 540 pounds per stream day of alumina precoat were needed to maintain an effluent of satisfactory HF and total fluoride content.

V (A) In this test, the effect of using ammonia in conjunction with alumina for fluoride removal was studied on a single bag filter. Using the Soderberg pot and bag of IV above, a 90 lb. precoat of fine alumina was placed on the bag and renewed (replaced) every 6 hours. This amount was not enough to decrease the fluoride level of the effluent to the desired 0.1 part per million level of HF. (This level was attained by injecting into the bag inlet 1.34 lbs. of ammonia per pot stream day. The total fluoride removal was 99% in this operation.)

(B) Following this same 6-hour cycle of operation, the amount of alumina precoat was reduced by increasing the addition rate of ammonia to achieve the same efficiency of fluoride removal.

(C) In conventional operation, this bag filter would have used about 540 lbs. of alumina as precoat per stream day to maintain a satisfactory level of total fluoride removal.

VI

The effect of heating the recovered "ammonia" solids was investigated with the following results:

(A) Samples of recovered solids from II were heated for one hour at temperatures of 250°, 500° and 750° C. The residues were analyzed and the results expressed as percentages of the original sample, i.e. the figures were corrected for the loss on ignition (LOI) which would naturally cause an apparent increase in concentration of the non-volatile constituents if no correction were made. The results are shown compared to the analysis of the original material.

|  | Original | 250° C. | 500° C. | 750° C. |
|---|---|---|---|---|
| LOI, percent |  | 4.35 | 17.70 | 32.06 |
| $SO_4$ | 10.92 | 10.89 | 9.15 | 0.15 |
| Na | 9.17 | 9.08 | 9.24 | 9.10 |
| $NH_4$ | 5.74 | 3.96 | (¹) | None |
| F | 26.90 | 26.02 | 25.68 | 24.73 |
| $Fe_2O_3$ | 2.55 | 2.74 | 3.03 | 3.40 |
| $SiO_2$ | 0.23 | 0.22 | 0.17 | 0.11 |
| $Al_2O_3$ | 30.04 | 32.21 | 33.43 | 34.03 |

¹ Not detected.

The apparent increase in iron and aluminum oxide with increase in temperature is believed to be the result of normal error in determining LOI.

It is seen at once that ammonia begins to be evolved at low temperature and is completely expelled at 500° C. This was expected since it was assumed that ammonium sulphate would sublime out. However, contrary to expectations it was found that very little sulphate was lost at 500° C., although it was evolved almost quantitatively at 750° C.

The stability of the fluoride compounds towards heat is also extremely encouraging. There is apparently only a small loss of fluorides (about 2% at 750° C.) which is probably accounted for by sublimation of ammonium fluoride and decomposition of the small amount of silicofluoride (the silicon content also reduces to one-half its original value).

(B) A closer examination of the decomposition at low temperatures was carried out with the following results.

| Temp., ° C. | Time of Heating | L.O.I. | Residue | |
|---|---|---|---|---|
| | | | Percent $NH_3$ | Percent $SO_4$ |
| 250 | 1 hour | 4.35 | 3.96 | |
| 250 | 4 hours | 9.16 | 1.01 | |
| 300 | 1 hour | 9.45 | 0.73 | |
| 300 | 4 hours | 10.75 | (¹) | |
| 400 | 1 hour | 16.62 | (¹) | 10.20 |

¹ Not detected.

It is thought the sulfate is present as salts of aluminum and iron, after the ammonia has evolved. At the higher temperatures of VI(A), the sulfate ion also is evolved probably as sulfur dioxide.

These results show that 4 hours' heating at 300° C. or shorter times at highed temperatures are sufficient to expel all the ammonia. The results also confirm that the sulfate it not evolved along with the ammonia at low temperatures.

VII

The heating tests described in VI were carried out on the original material caught in the bag filters. In practice the bags will usually contain alumina in relatively large quantities. It was though that the presence of a large excess of alumina might modify the decomposition. In the following tests the fluoride contents were measured after heating samples of the material with 10 times the weight of alumina, at the temperatures specified. Two variations were used, in one set of samples the ammonia solid was intimately mixed with the alumina before heating in crucibles, in the other set the alumina was not mixed but was placed as a layer on top of the ammonia solid. For the tests a new portion of the ammonia solid was taken and thoroughly blended so that all the figures in this group are directly comparable with one another. (They are not necessarily strictly comparable with the figures given in earlier tables since there may have been some variation in the original large sample.) The results quoted below for fluoride are again corrected for loss on ignition of the sample (and also for the small loss on ignition of the added alumina) so that they are again directly comparable with the analysis of the original ammonia solid.

| Sample | 250° C. | | 500° C. | | 750° C. | |
|---|---|---|---|---|---|---|
| | L.O.I. | Percent F | L.O.I. | Percent F | L.O.I. | Percent F |
| Material Alone | 8.67 | 24.94 | 23.67 | 24.66 | 26.00 | 23.00 |
| Mixed with $Al_2O_3$ | 11.70 | 22.51 | 22.20 | 22.03 | 35.78 | 20.40 |
| Covered with $Al_2O_3$ | 9.58 | 25.54 | 23.78 | 24.15 | 32.16 | 22.86 |

The surprising features of these data is that the sample mixed with alumina actually lost more fluorine than the material heated alone. The probable explanation is that the alumina contained a small amount of water. When intimately mixed with the solids and heated, this water probably reacted with the fixed fluorides liberating a small amount of HF, which is not liberated when the ammonia solids are heated alone. On the other hand, no such hydrolyses effect seems to occur when the alumina is added as a covering layer without mixing and the fluoride losses are then the same (within experimental error) as when the ammonia solid is heated alone.

Thus having described the invention, what is claimed is:

1. A process of treating waste-gas from an electrolytic aluminum reduction cell having a fused cryolite-alumina bath which process comprises:
   treating said waste-gas stream with ammonia gas at a temperature such that a solid ammonia reaction product is formed; and
   filtering said treated gas stream to remove said solid reaction product.

2. The process of claim 1 wherein sufficient ammonia gas is used to remove essentially all of the HF and other acidic gases present in said waste-gas.

3. The process of claim 1 wherein said filtering is accomplished by means of a bag filter.

4. The process of claim 3 wherein said bag filter is provided with a precoat.

5. The process of claim 4 wherein said precoat material is suitable for addition to said cell, and the mixture of precoat and solid reaction product is charged to said cell.

6. The process of claim 5 wherein said precoat is alumina.

7. The process of claim 5 wherein said precoat is cryolite, or calcium fluoride.

8. A process for recovering fluorine values present in waste gas from an electrolytic aluminum reduction cell having a fused cryolite-alumina bath which process comprises:

treating said waste gas stream with ammonia at a temperature such that solid ammonia reaction product is formed;

filtering said treated gas stream to recover said solid ammonia reaction product and other solid fluorine values present in said gas stream;

heating said recovered solids at conditions of temperature and time such that essentially all of the ammonia content is evolved therefrom leaving a solid fluorine value residue; and adding said residue to the bath portion of an electrolytic aluminum reduction cell.

9. The process of claim 8 wherein said recovered solids are heated at a temperature of at least about 300° for a time sufficient to evolve the ammonia content thereof.

10. The process of claim 8 wherein said recovered solids are heated on the crust portion of an aluminum reduction cell.

11. The process of claim 10 wherein said residue is charged to the bath of the cell on whose crust said recovered solids had been heated.

12. The process of claim 10 wherein said recovered solids are admixed with substantially anhydrous alumina.

13. The process of claim 12 wherein said recovered solids-alumina admixture is covered with alumina during said heating.

References Cited

UNITED STATES PATENTS

| | | | |
|---|---|---|---|
| 2,919,174 | 12/1959 | Pring | 204—67 |
| 3,006,825 | 10/1961 | Sem | 204—67 |
| 3,135,675 | 6/1964 | Berghaus et al. | 204—164 |
| 3,243,364 | 3/1966 | Kittlaus et al. | 204—67 |
| 3,257,296 | 6/1966 | Berghaus et al. | 204—67 |

JOHN H. MACK, *Primary Examiner.*

DONALD R. VALENTINE, *Assistant Examiner.*